United States Patent

Imai

Patent Number: 5,253,089
Date of Patent: Oct. 12, 1993

[54] BACKLIGHTED LIQUID CRYSTAL DISPLAY UNIT

[75] Inventor: Satoshi Imai, Kyoto, Japan
[73] Assignee: Rohm Co., Ltd., Kyoto, Japan
[21] Appl. No.: 894,095
[22] Filed: Jun. 5, 1992

[30] Foreign Application Priority Data

Nov. 7, 1991 [JP] Japan .................. 3-321085

[51] Int. Cl.$^5$ .............................. G02F 1/133
[52] U.S. Cl. ........................ 359/49; 359/42
[58] Field of Search ............ 359/42, 48, 49, 50

[56] References Cited

U.S. PATENT DOCUMENTS

| | | | |
|---|---|---|---|
| 4,167,307 | 9/1979 | Cirkler et al. | 359/48 |
| 4,974,122 | 11/1990 | Shaw | 359/48 |
| 5,039,207 | 8/1991 | Green | 359/49 |
| 5,050,946 | 9/1991 | Hathaway et al. | 359/48 |

FOREIGN PATENT DOCUMENTS 2161969  1/1986 United Kingdom .................. 359/48

*Primary Examiner*—William L. Sikes
*Assistant Examiner*—Huy K. Mai
*Attorney, Agent, or Firm*—Brumbaugh, Graves, Donohue & Raymond

[57] ABSTRACT

In a transmission-type liquid crystal display unit having an edge-type backlight in which light from a fluorescent lamp is conducted through a light-conducting plate to the rear surface of the display unit, the light-conducting plate has a light-receiving end face which is curved along the cylindrical wall of the fluorescent lamp and maintained in contact with the latter, so that the light from the fluorescent lamp is conducted to the display surface with high efficiency.

2 Claims, 2 Drawing Sheets

BACKLIGHTED LIQUID CRYSTAL DISPLAY UNIT

BACKGROUND OF THE INVENTION

This invention relates to transmission-type liquid crystal display units having an edge-type backlight.

As shown in FIGS. 3(a) and 3(b), conventional transmission-type liquid crystal display units having an edge-type backlight include a liquid crystal cell 10 consisting of two glass substrates 11 and 12 and a liquid crystal 13 sealed between the glass plates 11 and 12 with a seal member 14, and two polarizing plates 15 and 16 on the outer surfaces of the glass substrates 11 and 12, respectively.

The liquid crystal display unit, being a transmission-type display unit in which light is applied from below the liquid crystal cell, further comprises a light source 17 which is, in this case, a fluorescent lamp mounted on one side of the display unit, a light-conducting plate 18 such as an acrylic plate for conducting light from the light source to the entire lower surface of the display, and a reflecting sheet 19 to prevent light from the light source from passing away from the light-conducting plate 18.

The light-conducting plate 18 has a light-receiving end face 20 which extends perpendicular to the display surface of the liquid crystal cell 10, i.e., perpendicular to the light-emitting surface of the light-conducting plate 18. The light source 17 has a single line contact with the light-receiving end face of the light-conducting plate 18. In the liquid crystal display unit shown in FIG. 3(a), the thickness of the light-conducting plate 18 is equal to the diameter of the fluorescent lamp 17. In the liquid crystal display unit shown in FIG. 3(b), the thickness of the light-conducting plate 18 is half the diameter of the fluorescent lamp 17.

Light from the fluorescent lamp 17 enters the light-conducting plate 18 through the light-receiving end face 20 and is transmitted through the light-conducting plate 18 by repeated internal reflections. During such reflections, part of the light passes through the surface of the light-conducting plate 18 to enter the liquid crystal cell 10, thus permitting an illuminated display of the liquid crystal image.

FIG. 4 is an enlarged view showing the light-receiving end face 20 of the light-conducting plate 18 of FIG. 3(a). A light beam L1 from the fluorescent lamp 17 incident on the light-receiving end face 20 of the light-conducting plate 18 at an angle $\theta$ is divided into a light beam L2 reflected by the end face 20 and a light beam L3 transmitted into the light-conducting plate 18. The transmitted light beam L3 contributes to the backlight for the liquid crystal display while the reflected light beam L2 is useless.

Thus, as represented in FIG. 4, when a light beam from the fluorescent lamp 17 is applied to the light-receiving end face 20 of the light-conducting plate 18 at an angle $\theta$, the portion of the light beam reflected by the end face 20 is not useful in the display unit. At the contact line P between the lamp 17 and the end face 20, where $\theta = 90°$, the proportion of light in the reflected light beam L2 is close to zero. However, it should be noted that there is only one such contact line with the light-conducting plate 18 and therefore there is a high loss of light from the fluorescent lamp 17. As a result, in conventional backlighted liquid crystal display units, the display may not be bright enough to be seen easily.

In order to overcome this difficulty, it is necessary to use a larger fluorescent lamp providing a higher light output to take into account the loss of light, with the result that the size of the liquid crystal display unit is correspondingly increased.

SUMMARY OF THE INVENTION

Accordingly, an object of the present invention is to provide a backlighted liquid crystal display unit which overcomes the above-described disadvantages of conventional liquid crystal display units.

Another object of the invention is to provide a backlighting arrangement for a liquid crystal display unit in which the light from the light source is used with higher efficiency.

These and other objects of the invention are attained by providing an edge-type backlight arrangement for a liquid crystal display including a light source and a light-conducting plate for conducting light from the light source to the display surface of a liquid crystal display unit wherein the light source is in contact with the edge of the light-conducting plate in at least two contact regions. As used herein, the term "contact region" includes a line contact such as occurs between a cylindrical light source and a planar surface, a point contact such as occurs between a spherical light source and a planar surface, and an areal contact such as occurs when a surface is partially shaped to conform to a sphere or a cylinder.

A representative transmission-type liquid crystal display unit according to the invention has an edge-type back-light in which light from a light source is conducted through a light-conducting plate to the display surface thereof and the light-conducting plate has an edge which is in contact with the light source in at least two contact regions.

In a preferred liquid crystal display unit, the light source is in contact with the light-conducting plate at a plurality of contact regions in which substantially no light from the light source is reflected so that the loss of light due to reflection is correspondingly decreased and the light from the fluorescent lamp is more effectively utilized for the display. Thus, when the same fluorescent lamp is used, the backlighted liquid crystal display unit of the invention can provide displays which have a higher brightness than conventional displays.

Furthermore, to provide a display unit with the same brightness as in conventional liquid crystal display units, the light source may be replaced with a smaller light source providing a lower light intensity. As a result, the size of the backlight arrangement can be correspondingly reduced and the liquid crystal display unit can be similarly reduced in thickness and in size.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
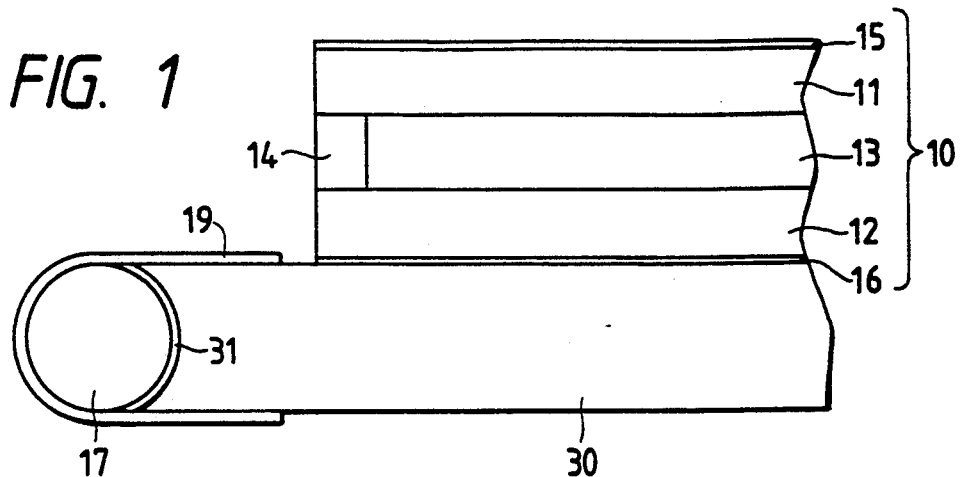
FIG. 1 is a cross-sectional schematic view showing a typical embodiment of a liquid crystal display unit arranged according to the invention.

The representative embodiment of a liquid crystal display unit according to the invention shown in FIG. 1 includes a liquid crystal cell 10, a fluorescent lamp 17, a light-conducting plate 30, and a reflecting sheet 19. The liquid crystal cell 10 comprises two glass plates 11 and 12, a liquid crystal 13 sealed between the glass plates 11 and 12 with a seal member 14, and two polarizing plates 15 and 16 provided on the outer surfaces of the glass plates 11 and 12, respectively. The fluorescent lamp 17, the light-conducting plate 30, and the reflecting sheet 19 are positioned beneath the liquid crystal cell 10.

In the preferred form of the invention, the light-conducting plate 30 has a light-receiving end face 31 which is curved along the outer cylindrical wall of the fluorescent lamp 17 so that the entire light-receiving end face 31 is in contact with the fluorescent lamp 17. With this arrangement, a larger proportion of the light emitted by the fluorescent lamp 17 enters the light-conducting plate 30 since the lamp has contact regions extending over substantially the entire surface of the end face 31 so that very little light is reflected by the end face.

Figure 2:
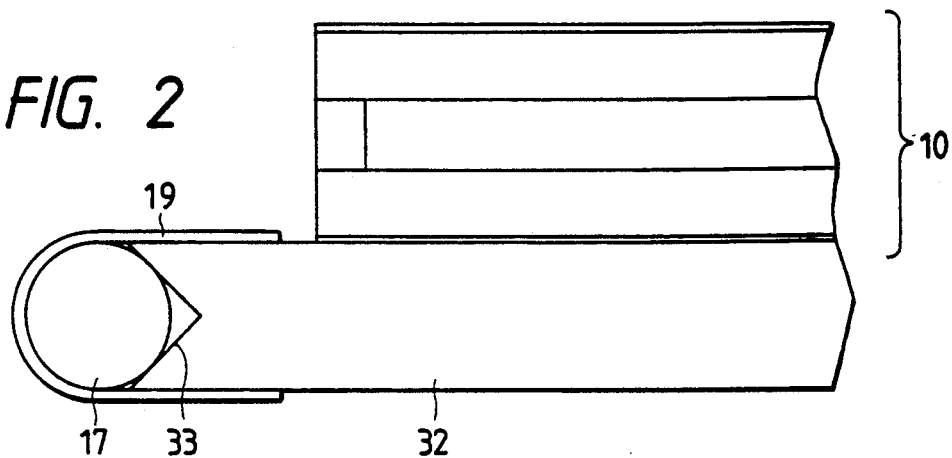
FIG. 2 is a cross-sectional schematic view showing another representative embodiment of a liquid crystal display unit according to the invention.
Figure 4:
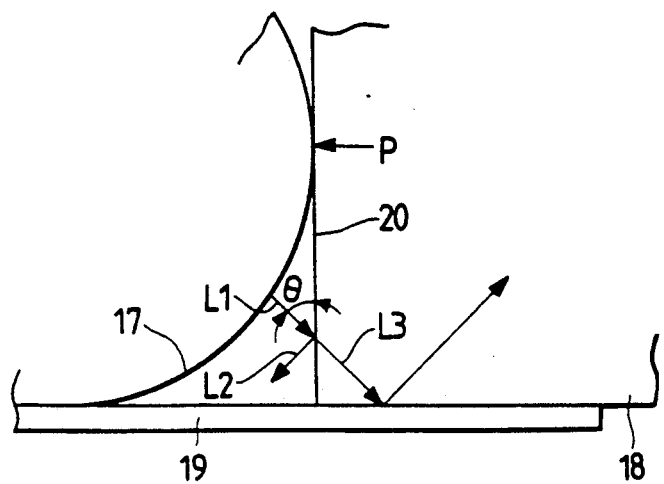
FIG. 4 is an enlarged fragmentary view showing light transmission from a fluorescent lamp to the edge of a light-conducting plate in a conventional liquid crystal display unit.
Figure 3A:
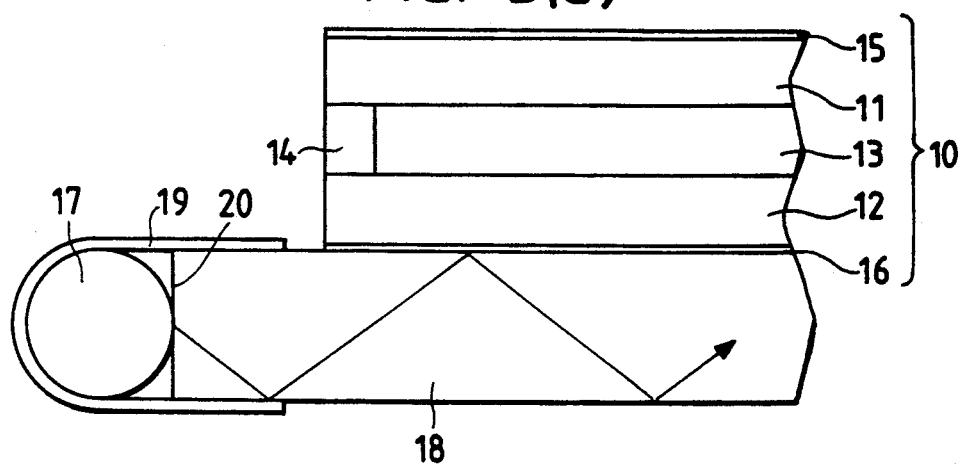
FIGS. 3(a) and 3(b) are cross-sectional schematic views showing two examples of conventional liquid crystal display units.
Figure 3B:
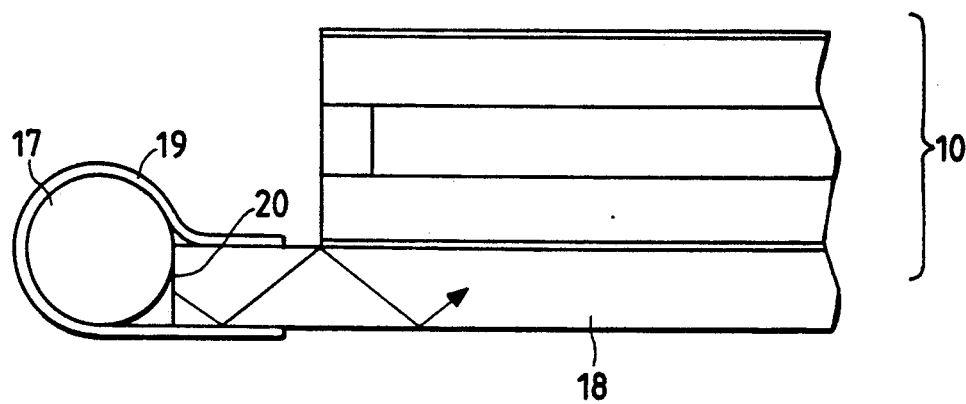

A second typical example of a liquid crystal display unit according to the invention is as shown in FIG. 2. In this display unit, a light-conducting plate 32 has two contact regions with the fluorescent lamp 17. Since very little light is reflected at the contact regions, the back-lighted liquid crystal display unit of the invention provides a much higher image brightness than the conventional units shown in FIGS. 3(a) and 3(b).

By increasing the number of contact regions, such as by making the light-receiving end face polygonal in cross-section, the loss of light by reflection is correspondingly decreased not only because of the greater amount of light transmitted where the light source and the end face are in contact, but also because the light from the light source is incident on the edge surface at an angle closer to 90° in the regions which are not in contact. By making the number of contact regions infinite, the liquid crystal display unit shown in FIG. 1 is obtained.

As described above, in the liquid crystal display unit of the invention, a plurality of contact regions are provided between the fluorescent lamp and the light-conducting plate and, therefore, the loss of light at the light-receiving end face is correspondingly decreased, that is, the light output of the fluorescent lamp is more effectively utilized for display. Accordingly, the liquid crystal display unit of the invention, when compared with conventional units, provides a display which has a high brightness and can be seen easily.

If only the same brightness provided by a conventional liquid crystal display unit is required, the fluorescent lamp may be replaced with a smaller lamp having a lower light output and the backlight arrangement can be correspondingly miniaturized. In other words, the liquid crystal display unit can be decreased in both thickness and in size.

Although the invention has been described with respect to specific embodiments, it will be obvious to those skilled in the art that various changes and modifications may be made therein. Accordingly, all such changes and modifications are included within the scope of the invention.

I claim:

1. A backlighted liquid crystal display comprising transmission-type liquid crystal display means having opposed surfaces, a light-conducting plate adjacent to one surface of the display means made of light-conducting material and having a light-receiving portion, and light source means in direct physical contact with the light-conducting material in the light-receiving portion of the light-conducting plate in at least two contact regions.

2. An edge-type backlight arrangement for a liquid crystal display comprising light source means and a light-conducting plate made of light-conducting material for conducting light from a light-receiving portion adjacent to the light source means to a surface of a liquid crystal display wherein the light source means is in direct physical contact with the light-conducting material in the light-receiving portion of the light-conducting plate in at least two contact regions.

* * * * *